United States Patent
Buttafuoco et al.

(10) Patent No.: US 8,763,628 B2
(45) Date of Patent: Jul. 1, 2014

(54) ELECTROMECHANICAL VALVE FOR THE PNEUMATIC ACTUATION OF A DEVICE OF AN INTERNAL COMBUSTION ENGINE

(75) Inventors: Luca Buttafuoco, Turin (IT); Giuseppe Marrara, Venaria (IT); Roberto Reginato, Carmagnola (IT)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 13/316,619

(22) Filed: Dec. 12, 2011

(65) Prior Publication Data
US 2012/0145109 A1  Jun. 14, 2012

(30) Foreign Application Priority Data
Dec. 13, 2010 (GB) .................................. 1021074.8

(51) Int. Cl.
*A01M 7/00* (2006.01)

(52) U.S. Cl.
USPC ........................................................ 137/351

(58) Field of Classification Search
USPC ........................... 137/343, 351, 899; 251/143
See application file for complete search history.

(56) References Cited

U.S. PATENT DOCUMENTS

| | | | | | |
|---|---|---|---|---|---|
| 2,432,050 | A | * | 12/1947 | Thiry | 267/140.11 |
| 2,520,442 | A | * | 8/1950 | Schwartz | 267/140.4 |
| 3,154,273 | A | * | 10/1964 | Paulsen | 267/140.11 |
| 5,393,133 | A | | 2/1995 | Fujimoto | |
| 7,334,848 | B2 | * | 2/2008 | Segawa et al. | 303/119.3 |
| 7,407,234 | B1 | | 8/2008 | McCormick | |

* cited by examiner

*Primary Examiner* — John K Fristoe, Jr.
*Assistant Examiner* — Kevin E Lynn
(74) *Attorney, Agent, or Firm* — Ingrassia Fisher & Lorenz, P.C.

(57) ABSTRACT

An electromechanical valve is provided for the pneumatic actuation of a device of an internal combustion engine that includes, but is not limited to an external casing and one or more supporting dampers embedded in the external casing.

15 Claims, 3 Drawing Sheets

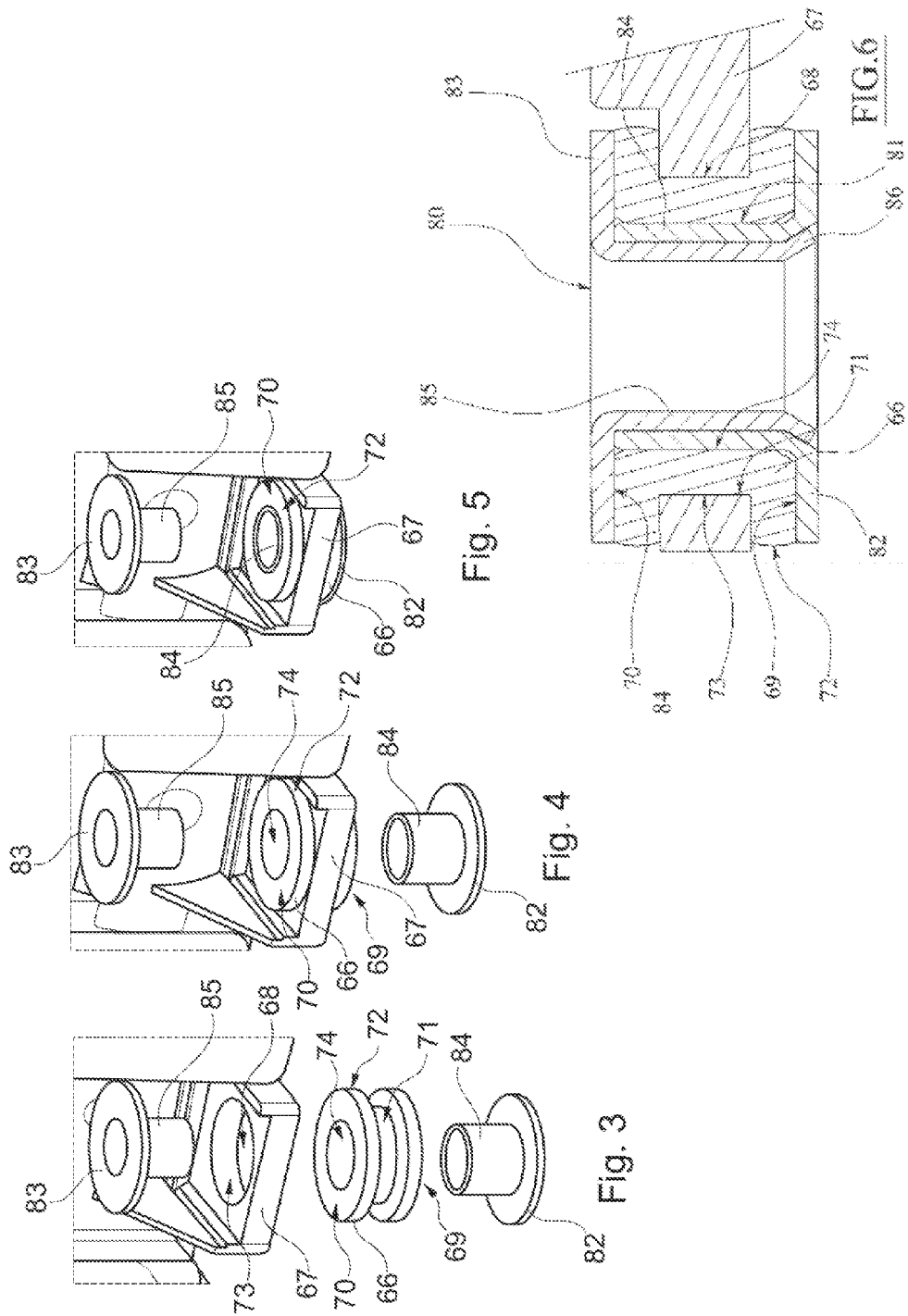

ELECTROMECHANICAL VALVE FOR THE PNEUMATIC ACTUATION OF A DEVICE OF AN INTERNAL COMBUSTION ENGINE

CROSS-REFERENCE TO RELATED APPLICATION

This application claims priority to British Patent Application No. 1021074.8, filed Dec. 13, 2010, which is incorporated herein by reference in its entirety.

TECHNICAL FIELD

The technical field invention relates to an electromechanical valve for the pneumatic actuation of a device of an internal combustion engine, especially of an internal combustion engine of a motor vehicle, such as for example a Diesel engine or a gasoline engine.

BACKGROUND

It is known that modern internal combustion engine can be equipped with one or more devices whose operation need a pneumatic actuation, for instance a Variable Geometry Turbocharger (VGT), a Variable Flow Turbocharger (VFT) or a waste gate valve associated to a Fixed Geometry Turbocharger (FGT). In fact, the VGT and the VFT are turbochargers designed for regulating the direction of the exhaust flow driving the turbine wheel, in order to optimize the turbine efficiency under different engine operating conditions, principally under different values of the engine speed.

For operating such regulation, a VFT generally comprises a movable flap member, whose position is adjustable to vary the geometry of the turbine chamber, while a VGT comprise a plurality of vanes inside the turbine chamber, which are arranged for guiding the incoming exhaust flow towards the turbine wheel, and which are movable so as to vary their angle. The waste gate valve is a bypass valve installed in the exhaust pipe upstream of the turbine inlet of a FGT, which comprises a movable valve element, whose position is adjustable such that, at high engine speeds, part of the incoming exhaust gas flow bypasses the turbine wheel. The movable flap of the VFT, the movable vanes of the VGT and the movable valve element of the waste gate valve are conventionally moved by a pneumatic actuator.

This pneumatic actuator can be controlled by a three-way electromechanical proportional valve (EPV), typically a solenoid valve, having a first port in communication with the atmosphere, a second port in communication with a vacuum tank or vacuum pump, and a third port in communication with the pneumatic actuator. The EPV, controlled by an engine control unit (ECU), regulates the pressure delivered to the pneumatic actuator, in a range between the atmospheric value and the negative value of the vacuum tank or pump, so that the variation of this pressure causes the pneumatic actuator to move the movable flap of the VFT, the movable vanes of the VGT or the movable valve element of the waste gate valve.

The EPV is generally manufactured as an independent device comprising an its own external casing, typically made of plastic, which is provided with the above named three ports and which encloses also a movable valve member for choking these ports as well as the solenoid for actuating this movable valve member, so that the EPV needs of being fastened to the engine or anyway to another component inside the engine compartment of the motor vehicle. However, the EPV is very sensitive to vibrations, such as those generated by the engine operation, which can cause the movable valve member of the EPV to move even if no electrical command has been issued by the ECU, thereby improperly varying the inclination of the turbine vanes. For this reason, the external casing of the EPV is usually fastened to the engine with the interposition of a plurality of supporting dampers, which are suitable for attenuating the vibrations transmitted to the EPV. By way of example, these supporting dampers can be cylindrical hollow pads made of rubber, which are individually fixed and compressed by a screw-bolt between the external casing of the EPV and a dedicated mounting bracket that is screwed on the engine.

In view of the above, it follows that the fastening of the EPV involves many individual components, which slow down and complicate the whole operation, which occupy a comparatively wide space within the engine compartment, and which are usually provided by different suppliers, thereby increasing also the quality control effort and the overall manufacturing cost. Another drawback of the above-mentioned solution for fastening the EPV is that, resting the head of the screw-bolts on the EPV casing, the tightening torque of the screw-bolts should be kept under the breaking limit of the casing material, which could be insufficient for guaranteeing a proper strength of the fastening.

Therefore, at least one aim of an embodiment is therefore to simplify and speed up the assemblage of the EPV. At least another aim is to increase the fastening strength of the EPV on the engine, without compromising a proper compression of the supporting dampers. At least yet, another aim is to reach the above-mentioned goals with a simple, rational, and rather inexpensive solution. In addition, other aimsm objects, desirable features, and characteristics will become apparent from the subsequent summary and detailed description, and the appended claims, taken in conjunction with the accompanying drawings and this background.

SUMMARY

An embodiment provides an electromechanical valve for the pneumatic actuation of a device of an internal combustion engine, such as for example a VGT, a VFT or a waste gate valve, wherein the electromechanical valve comprises an external casing and one or more supporting dampers embedded in the external casing. In this way, these embedded supporting dampers are integral with the external casing, so that the electromechanical valve with the supporting dampers can be advantageously realized and managed as a whole, reducing the number of individual components involved in its fastening and so the workload, the number of suppliers and also the overall manufacturing cost. By way of example, thanks to the supporting dampers embedded in the external casing, the electromechanical valve can be fastened with simple screws instead of the conventional screw-bolts, so that the mounting bracket becomes unnecessary.

According to an embodiment, each supporting damper is provided with a perimetrical groove on its side surface, while a wall of the external casing is provided with an opening whose perimetrical edge fits the said perimetrical groove and surrounds the supporting damper at least partially. This solution advantageously guarantees a secure joint between the supporting damper and the external casing. More particularly, the above named opening can be a hole whose perimetrical edge surrounds the supporting damper completely, thereby advantageously strengthening their mutual joint.

According to another embodiment, each supporting damper is made of rubber. The rubber is a low cost elastic material whose mechanical properties guarantee an adequate attenuation of the vibrations.

According to another embodiment, each supporting damper is cylindrical. The cylindrical shape has the advantage of being easier to manufacture than many other shape.

According to another embodiment, each supporting damper is provided with a bore passing through its thickness. This embodiment has the advantages that the bore can effectively accommodate respective fastening screws, so that the head of this screw can act on the supporting damper and not on the external casing. Consequently, the external casing is not affected by the fastening force exerted by the screw, whose tightening torque can be therefore increased in order to strengthen the fastening of the electromechanical valve.

According to still another embodiment, each supporting damper is provided with a frame for preventing the compression of the supporting damper. This frame advantageously allows meeting the desired values of the above-mentioned tightening torque, without damaging the supporting damper. In particular, the frame can be embodied as a stem, which is axially inserted into the bore of the supporting damper, and whose opposite ends are individually provided with a respective flange that rests on the supporting damper. In this way, the frame results effective, very simple, and rather inexpensive. According to an embodiment of this frame, the stem is tube-shaped in order to allow the fastening screw to pass therein. According to another embodiment of this frame, the stem comprises two sleeves coaxially inserted into each other, each of which is integral with one of the above-mentioned flanges.

Thanks to this solution, the two sleeves can be made slide in order to bring the flanges nearer, and thus to compress the support damper, until the free end of the external sleeve contacts the flange of the internal sleeve, after which the sleeves prevent any further compression of the support damper. Therefore, the sleeves can be advantageously dimensioned in order to guarantee a desired value of support damper compression, independently from the tightening torque applied to the fastening screw.

According to still another embodiment of the frame, the two sleeves are provided with means for preventing their mutual unthreading once they are in a predetermined mutual position. In this way, the sleeves can be advantageously pre-assembled on the respective support damper, thereby becoming integral with the valve casing and thus reducing the number of components to be managed and assembled during the fastening of the valve.

A pneumatically actuated device is also provided for an internal combustion engine, such as for example a VGT, a VFT or a waste gate valve, which comprises the electromechanical valve described above, and as an internal combustion engine comprising this pneumatically actuated device.

BRIEF DESCRIPTION OF THE DRAWINGS

The present invention will hereinafter be described in conjunction with the following drawing figures, wherein like numerals denote like elements, and:

FIG. 3 to FIG. 5 show three stage of the assemblage of a supporting damper of the EPV of FIG. 2; and FIG. 6 shows a section of the supporting damper of FIG. 3 to FIG. 5.

DETAILED DESCRIPTION

Figure 1:
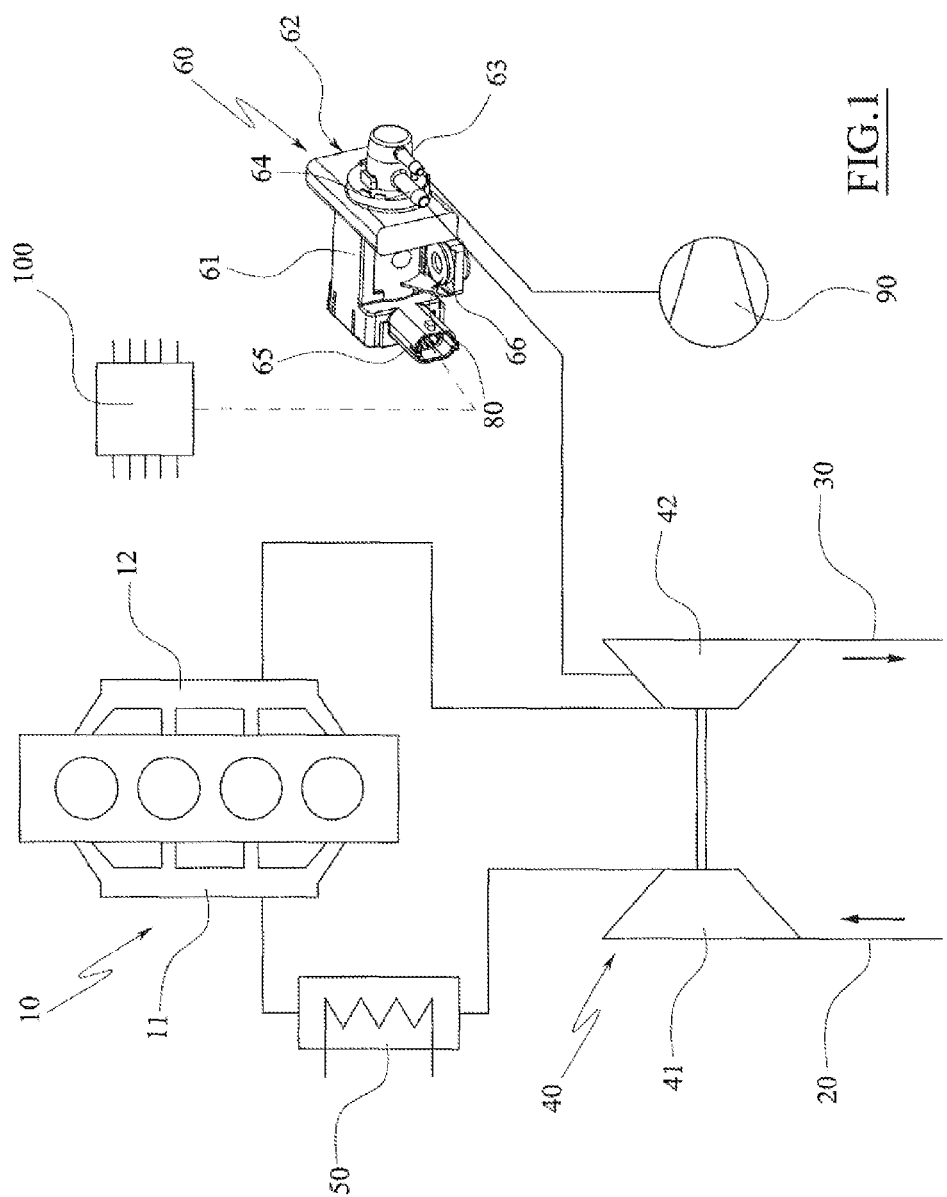
FIG. 1 schematically shows a turbocharged internal combustion engine of a motor vehicle.

The following detailed description is merely exemplary in nature and is not intended to limit application and uses. Furthermore, there is no intention to be bound by any theory presented in the preceding background or summary or the following detailed description.

The turbocharged internal combustion engine 10 disclosed as an embodiment is a Diesel engine, but it could be also a gasoline engine. The turbocharged internal combustion engine 10 schematically comprises an intake manifold 11, an exhaust manifold 12, an intake pipe 20 for feeding fresh air from the atmosphere into the intake manifold 11, an exhaust pipe 30 for discharging the exhaust gas from the exhaust manifold 12 into the atmosphere, and a variable geometry turbocharger (VGT) 40, which comprises a compressor 41 located in the intake pipe 20, for compressing the air stream flowing therein, and a turbine 42 located in the exhaust pipe 30, for driving the compressor 41. A charge air cooler 50 is located in the intake pipe 20 downstream of the compressor 41, in order to cool the air stream before it reaches the intake manifold 11.

According to a design of the VGT 40, the housing of the turbine 42 encloses a plurality of vanes, which are arranged for guiding the incoming exhaust flow towards the turbine rotor (not shown), and which are movable so as to vary their angle and thus modify the direction of the exhaust flow. These movable vanes are driven by a pneumatic actuator (not shown), which is controlled by an external three-way electromechanical proportional valve (EPV) 60, in the present case a solenoid valve.

The EPV 60 comprises an external casing 61, typically made of plastic, which is provided with a first port 62 communicating with the atmosphere, a second port 63 communicating with a vacuum pump 90, and a third port 64 communicating with the above named pneumatic actuator. Moreover, the external casing 61 encloses a movable valve member for choking these ports 62-64, as well as the solenoid for actuating this movable valve member. The EPV 60 further comprises an electric connector 65 wired to an engine control unit (ECU) 100, which controls the EPV 60 in order to regulate the pressure delivered to the pneumatic actuator, in the range between the atmospheric value and the negative value of the vacuum pump 90, so that the variation of this pressure causes the pneumatic actuator to move the turbine vanes of the VGT 40 accordingly. In order to fasten the EPV 60 to the engine 10 (or to any other suitable component inside the engine compartment of the motor vehicle), the EPV 60 comprises two supporting dampers 66, only one of which is visible in the drawings.

Figure 2:
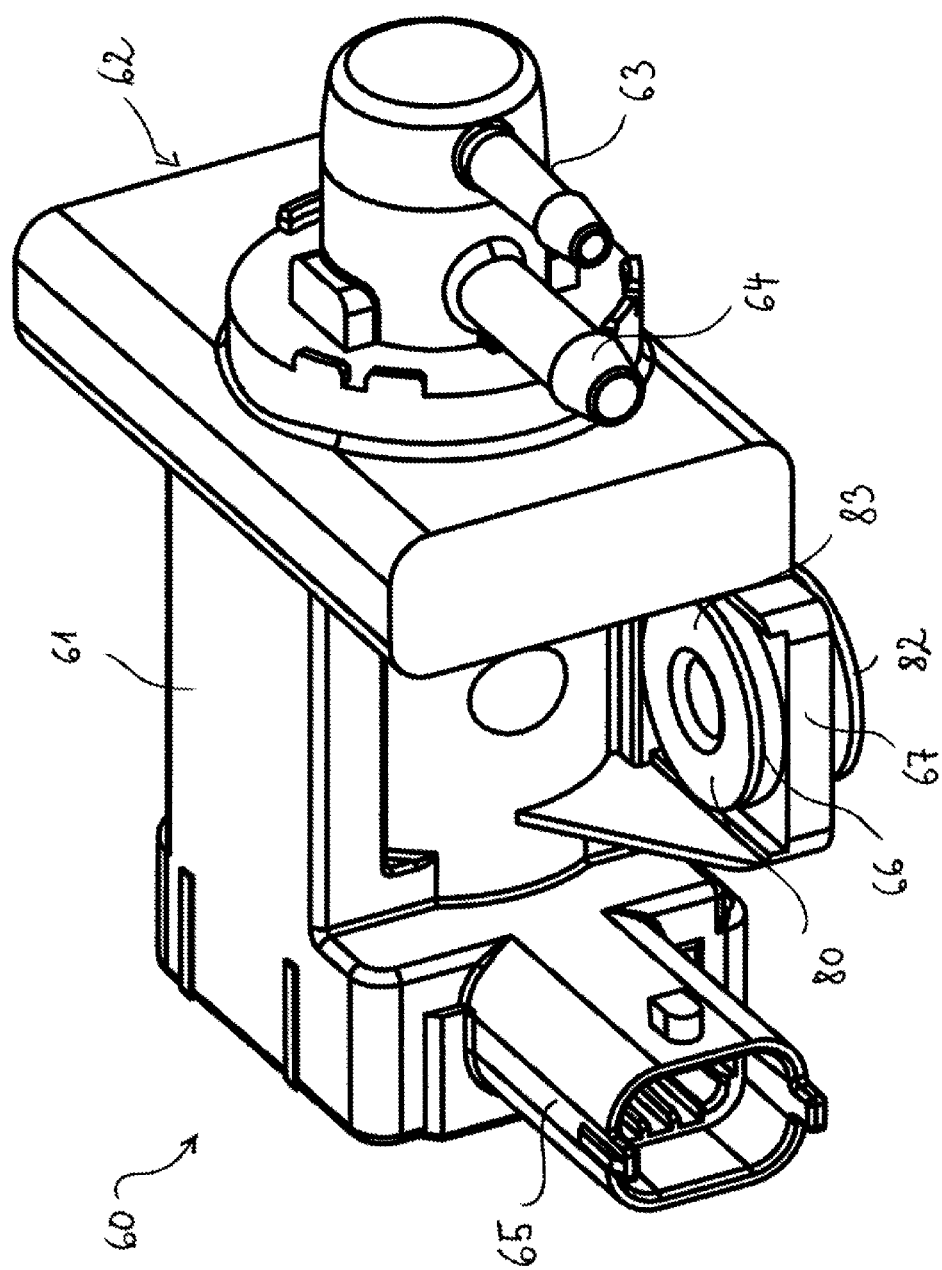
FIG. 2 is a prospective view of a EPV of the internal combustion engine of FIG. 1.

As shown in FIG. 2 to FIG. 6, each supporting damper 66 is a thin cylindrical pad of elastic material, in the present case of synthetic rubber, which is embedded in a respective wall 67 of the external casing 61, which in turn is plate and thin and juts out like a fin or a rib. More particularly, the supporting damper 66 is embedded in the wall 67 by being coaxially inserted and secured in a passing hole 68 of this wall 67. The thickness of the supporting damper 66 is greater than the thickness of the wall 67, so that both the lower face 69 and the upper face 70 of the supporting damper 66 are spaced from the opposite surfaces of the wall 67.

The supporting damper 66 is provided with a perimetrical groove 71 realized on its side surface 72, whose width is approximately equal to the thickness of the wall 67 and whose internal diameter is approximately equal to the diameter of the hole 68. In this way, the perimetrical groove 71 engages the perimetrical edge 73 of the hole 68 (see FIG. 6), thereby realizing a joint that axially secures the supporting damper 66 to the wall 67 of the external casing 61. In the present case, since the perimetrical edge 73 of the hole 68 surrounds the supporting damper 66 completely, the joint prevents also the mutual lateral movements, thereby totally binding the supporting damper 66 to the wall 67.

From a manufacturing point of view, each supporting damper 66 is coupled to the respective hole 68 as shown in FIG. 3 and FIG. 4. Each supporting damper 66 is equipped with a frame 80 comprising a tubular shaped stem 81, which is axially inserted into a central bore 74 passing through the thickness of the supporting damper 66, and whose opposite ends are individually provided with a protruding annular flange, namely a lower flange 82 resting on the lower face 69 of the supporting damper 66 and an upper flange 83 resting on the upper face 70. More particularly, the stem 81 comprises two separated sleeves of plastic, namely a lower sleeve 84 and an upper sleeve 85, each of which is realized as a single body with the lower flanges 82 and the upper flange 83 respectively.

As shown in FIG. 3 to FIG. 5, the two sleeves 84 and 85 are inserted in the bore 74 from opposite sides, with the upper sleeve 85 further inserted into lower sleeve 84. In this way, the two sleeves 84 and 85 can slide mutually in order to bring the flanges 82 and 83 nearer, and thus to progressively compress the supporting damper 66. In particular, the upper sleeve 85 is showed to slide into the interrelated lower sleeve 84 until the free end of the lower sleeve 84 leans against the upper flange 83 as shown in FIG. 6, namely until the sleeves 84 and 85 are axially packed so as to prevent any further compression of the supporting damper 66. The sleeves 84 and 85 are dimensioned to reach this packed configuration once the compression of the supporting damper 66 is at a desired optimal level.

As shown in FIG. 6, the free end of the upper sleeve 85 further comprises a small protruding collar 86 which engages the internal edge of the lower flange 82, in order to prevent the sleeves 84 and 85 to mutually unthread, once they have reached the above-mentioned packed configuration. In this way, the supporting damper 66 is kept pre-compressed and the sleeves 84 and 85 become integral with external casing 61, thereby providing an EPV 60 ready to be fastened to the engine 10. More particularly, this fastening is achieved by laying the lower flange 82 of each supporting dampers 66 onto the engine component to which the EPV 60 has to be fastened, and by inserting a fastening screw in the stem 81 of the frame 80, so that the head of the screw rests on the upper flange 83 whereas the stem of the screw is screwed into a threaded hole of the said engine component.

The engine component, the fastening screws and the correspondent threaded holes are not shown in the drawings, because they are of conventional kind. Thanks to this solution, the walls 67 of the EPV external casing 61 are not subjected to the fastening force exerted by the fastening screws, nor the supporting dampers 66 can be compressed further (thanks to the frame 80), so that the tightening torque applied to the fasting screws can be properly increased in order to achieve an optimal strength of the fastening.

While the EPV 60 has been previously described for the pneumatic actuation of the VGT 40, it should be appreciated that the same EPV 60 can be used for the pneumatic actuation of other devices of an internal combustion engine, such as for example a Variable Flow Turbocharger (VFT) or a waste gate valve of a Fixed Geometry Turbocharger (FGT). Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. An electromechanical valve for pneumatic actuation of a device of an internal combustion engine, comprising:
   a movable valve member;
   an external casing at least partially enclosing the movable valve member; and
   a supporting damper embedded in the external casing, wherein the supporting damper comprises a perimetrical groove on a side surface, and wherein the supporting damper comprises a bore passing through a thickness of the supporting damper, and wherein the supporting damper comprises a frame that is configured to prevent a compression of the supporting damper, and wherein the frame comprises a stem axially inserted into the bore having opposite ends that are each provided with a respective flange that rests on the supporting damper, and wherein the stem comprises two sleeves coaxially inserted into each other, each of the two sleeves is integral with the flange, and
   wherein a wall of the external casing comprises an opening with a perimetrical edge that fits the perimetrical groove and at least partially surrounds the supporting damper.

2. The electromechanical valve according to claim 1, wherein the opening is an aperture with the perimetrical edge that completely surrounds the supporting damper.

3. The electromechanical valve according to claim 1, wherein the supporting damper is at least partially formed of rubber.

4. The electromechanical valve according to claim 1, wherein the supporting damper is cylindrical.

5. The electromechanical valve according to claim 1, wherein the stem is tube-shaped.

6. The electromechanical valve according to claim 1, wherein a first of the two sleeves includes a protruding collar and a second of the two sleeves includes an internal edge, and wherein the protruding collar and the internal edge comprise a prevent apparatus that is configured to prevent mutual unthreading once the two sleeves are in a predetermined mutual position.

7. A pneumatically actuated device for an internal combustion engine, comprising:
   a movable member;
   an external casing at least partially enclosing the movable member; and
   a supporting damper embedded in the external casing, wherein the supporting damper comprises a perimetrical groove on a side surface, and wherein the supporting damper comprises a bore passing through a thickness of the supporting damper, and wherein the supporting damper comprises a frame that is configured to prevent a compression of the supporting damper, and wherein the frame comprises a stem axially inserted into the bore having opposite ends that are each provided with a respective flange that rests on the supporting damper, and wherein the stem comprises two sleeves coaxially inserted into each other, each of the two sleeves is integral with the flange, and
   wherein a wall of the external casing comprises an opening with a perimetrical edge that fits the perimetrical groove and at least partially surrounds the supporting damper.

8. The pneumatically actuated device according to claim 7, wherein the supporting damper comprises a perimetrical groove on a side surface, and wherein a wall of the external casing comprises an opening with a perimetrical edge that fits the perimetrical groove and at least partially surrounds the supporting damper.

9. The pneumatically actuated device according to claim 8, wherein the opening is an aperture with the perimetrical edge that completely surrounds the supporting damper.

10. The pneumatically actuated device according to claim 7, wherein the supporting damper is at least partially formed of rubber.

11. The pneumatically actuated device according to claim 7, wherein the supporting damper is cylindrical.

12. The pneumatically actuated device according to claim 7, wherein the supporting damper comprises a bore passing through a thickness of the supporting damper.

13. The pneumatically actuated device according to claim 12, wherein the supporting damper comprises a frame that is configured to prevent a compression of the supporting damper.

14. The pneumatically actuated device according to claim 13, wherein the frame comprises a stem axially inserted into the bore having opposite ends that are each provided with a respective flange that rests on the supporting damper.

15. The pneumatically actuated device according to claim 14, wherein the stem is tube-shaped.

\* \* \* \* \*